United States Patent
Sattinger et al.

(10) Patent No.: US 6,530,221 B1
(45) Date of Patent: Mar. 11, 2003

(54) MODULAR RESONATORS FOR SUPPRESSING COMBUSTION INSTABILITIES IN GAS TURBINE POWER PLANTS

(75) Inventors: Stanley S. Sattinger, McDonald, PA (US); Douglas Dean Darling, Nashville, TN (US); Roy Kyle Holbert, Oviedo, FL (US); William E. Kepes, Trafford, PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/667,409

(22) Filed: Sep. 21, 2000

(51) Int. Cl.[7] ................................................. F02C 7/24
(52) U.S. Cl. ........................... 60/725; 431/114; 181/213
(58) Field of Search ............................ 60/725; 431/114; 181/213

(56) References Cited

U.S. PATENT DOCUMENTS

| | | | |
|---|---|---|---|
| 2,807,931 A | * 10/1957 | Bodine | 60/35.6 |
| 3,113,634 A | 12/1963 | Watters | |
| 3,159,238 A | * 12/1964 | Shearer | 181/33 |
| 4,199,936 A | * 4/1980 | Cowan | 60/226 R |
| 4,449,607 A | 5/1984 | Forestier et al. | |
| 4,944,362 A | 7/1990 | Motsinger et al. | |
| 5,373,695 A | 12/1994 | Aigner et al. | |
| 5,590,849 A | 1/1997 | Pla | |
| 5,685,157 A | 11/1997 | Pandalai et al. | |
| 5,975,238 A | 11/1999 | Fuchs et al. | |

FOREIGN PATENT DOCUMENTS

| | | |
|---|---|---|
| EP | 2309296 | 7/1997 |
| EP | 0892216 | 1/1999 |
| GB | 0892219 | 1/1999 |

* cited by examiner

Primary Examiner—Ehud Gartenberg

(57) ABSTRACT

A resonator module for a combustion turbine power plant, where the combustion turbine power plant defines a flow path. The resonator module includes a first member, an a second member. The first member has a size substantially smaller than the diameter of said flow path and a plurality of openings therethrough. The openings are in fluid communication with the flow path. The second member has a size generally equal to said first member. The second member is in a generally spaced relation to the first member and encloses a volume of gas between the first and second members.

7 Claims, 8 Drawing Sheets

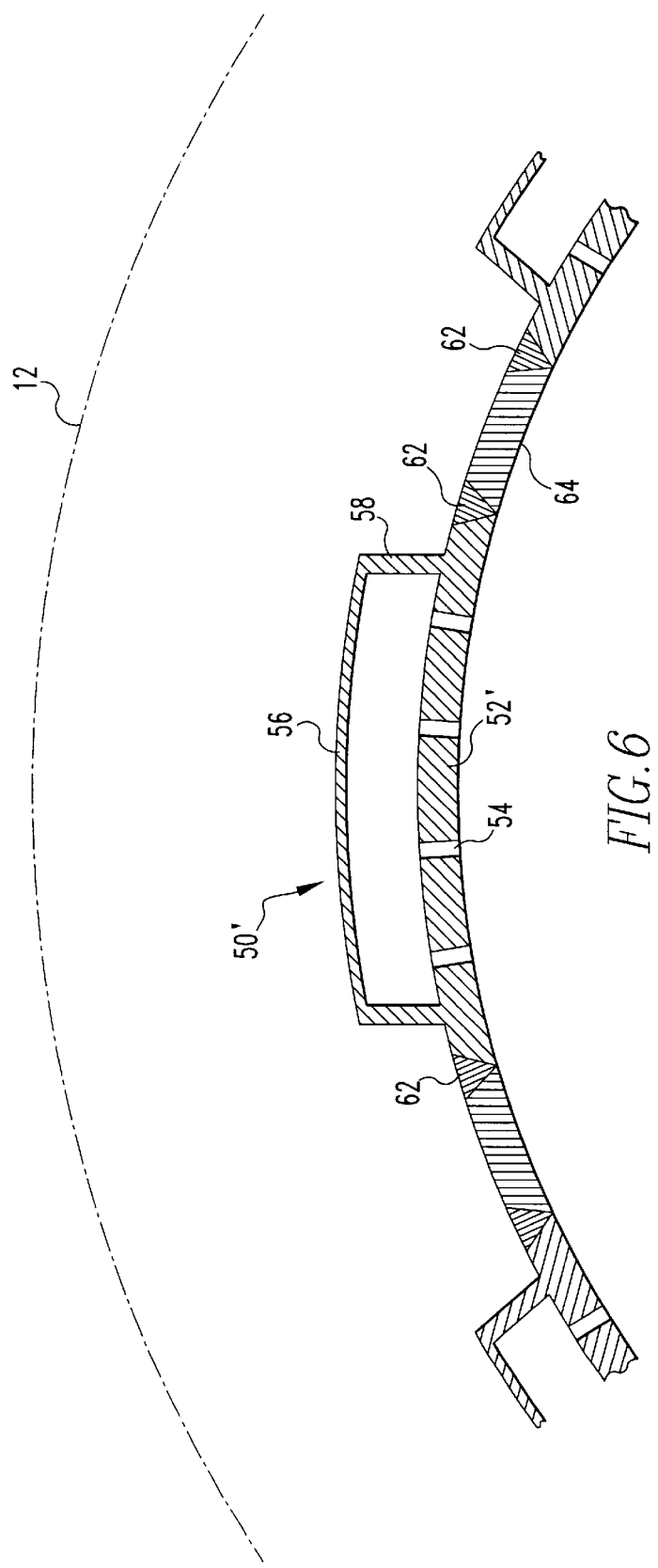

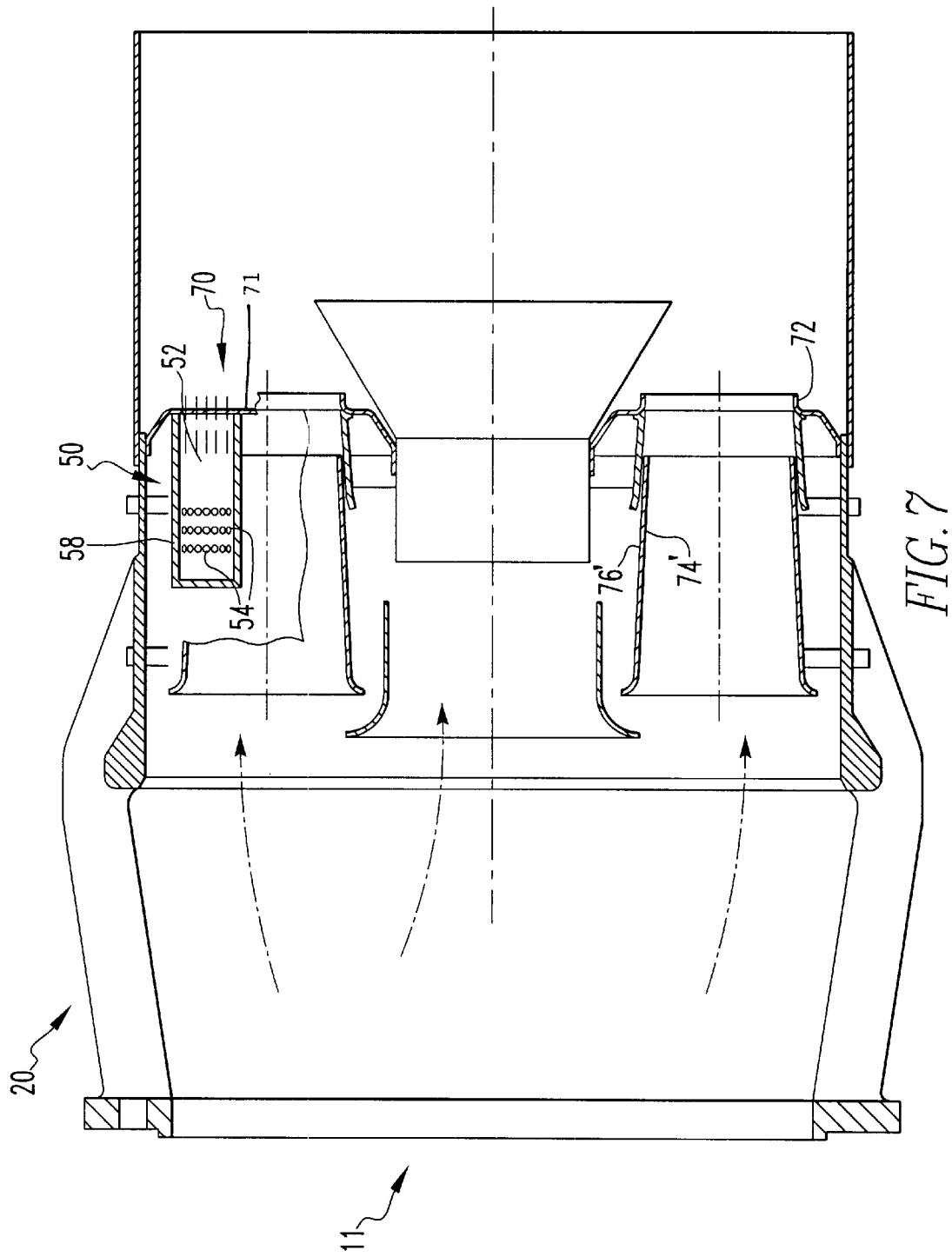

MODULAR RESONATORS FOR SUPPRESSING COMBUSTION INSTABILITIES IN GAS TURBINE POWER PLANTS

BACKGROUND OF THE INVENTION

1. Field of the Invention

This invention relates to a resonator for suppressing acoustic energy in a combustion turbine power plant and, more specifically, to a modular resonator which may be placed at the location within the combustion turbine power plant having the highest acoustic pressure amplitude and, to a method of placing modular resonators throughout a combustion turbine at the location of the highest acoustic pressure.

2. Background Information

To reduce the amount of $NO_x$ emissions from a combustion turbine power plant, it is known to provide a lean-premix fuel to the power plant's combustor. A fuel-lean premix includes a fuel premixed with a large excess of air. While the fuel-lean premix reduces the amount of $NO_x$ emissions, high frequency combustion instabilities, commonly referred to as "high frequency dynamics" or "screech oscillations," result from burning rate fluctuations inside the combustors which consume the fuel-lean premix. These instabilities may create damaging pressure waves caused by burning rate fluctuations. It is desirable to provide a means of acoustic dampening to suppress the acoustic energy.

One commonly used type of dampening device is a Helmholtz resonator. A Helmholtz resonator provides a closed cavity having one sidewall with openings therethrough. The fluid inertia of the gases within the pattern of holes is reacted by the volumetric stiffness of the closed cavity, producing a resonance in the velocity of flow through the holes. This flow oscillation has a well-defined natural frequency and provides an effective mechanism for absorbing acoustic energy.

Prior art Helmholtz resonators have been in the form of monolithic liners extending over large areas of the combustion chamber walls. Such monolithic liners can be subject to high thermal stress due to the large temperature differences that may occur between the combustion chamber liner and outer walls of the combustion chamber. Monolithic liners may also be difficult to install as the components may interfere with other components of the combustion turbine power plant. Because of these conflicts, monolithic liners are typically restricted to use near the head of a combustor. Additionally, the monolithic liners are supported by circumferentially oriented ribs, honeycomb cells, or other means which provide a compartnentation of the area behind the liner. These structures result in complex, sealed compartment vessel configurations which can be costly to fabricate. Other types of resonators, such as flow-through resonators, have been placed on support plates upstream of the combustor assembly, see e.g. U.S. Pat. No. 5,373,695. Such resonators, however, are structured to be placed in the available space on a cover plate, not at the location of the highest acoustical pressure.

There is a need, therefore, for a modular resonator which may be placed at the location(s) within the combustion turbine flow path having the highest acoustical pressure amplitude.

There is a further need for a modular resonator with a structure that is less susceptible to thermal stress.

There is a further need for a modular resonator that is not adversely affected by thermal stress.

SUMMARY OF THE INVENTION

These needs, and others, are met by the invention which provides for a modular resonator having a limited size which may be placed anywhere within the combustion turbine flow path. The modular resonator includes a first member having a plurality of holes therethrough, a second member, and a sidewall holding the second member in spaced relation to the first member. In this configuration, the modular resonator is a closed cavity having a plurality of openings on one wall. Preferably, the first member is located along proximal to the combustor assembly downstream of the combustion zone. More than one modular resonator may be located along the circumference of the transition section.

The modular resonator may also be configured with openings in the second member. Preferably, the openings in the second member are coupled to a purging flow of a gas which is at a greater pressure than the gas in the transition section. The amount of purging gas passing through the second member may be adjusted to change the acoustic resistance of the modular resonator.

In an alternate configuration, the combustion turbine may include a resonator support structure located within the combustion turbine's flow path. The support structure preferably supports a plurality of tubular members axially aligned with the flow path having a plurality of modular resonators disposed thereon. In this configuration, a portion of the tubular members act as the first member of the modular resonator. The second members may be located either inside or outside the tubular members. Again, the modular resonators may be coupled to a purging gas source.

BRIEF DESCRIPTION OF THE DRAWINGS

A full understanding of the invention can be gained from the following description of the preferred embodiments when read in conjunction with the accompanying drawings in which:

FIG. 6 is a cross-sectional view of an alternate embodiment where the modular resonators are integral to the transition section housing.

FIG. 7 is an alternate embodiment where the modular resonators are disposed on a support structure within the flow path.

DETAILED DESCRIPTION OF THE PREFERRED EMBODIMENT

Figure 1:
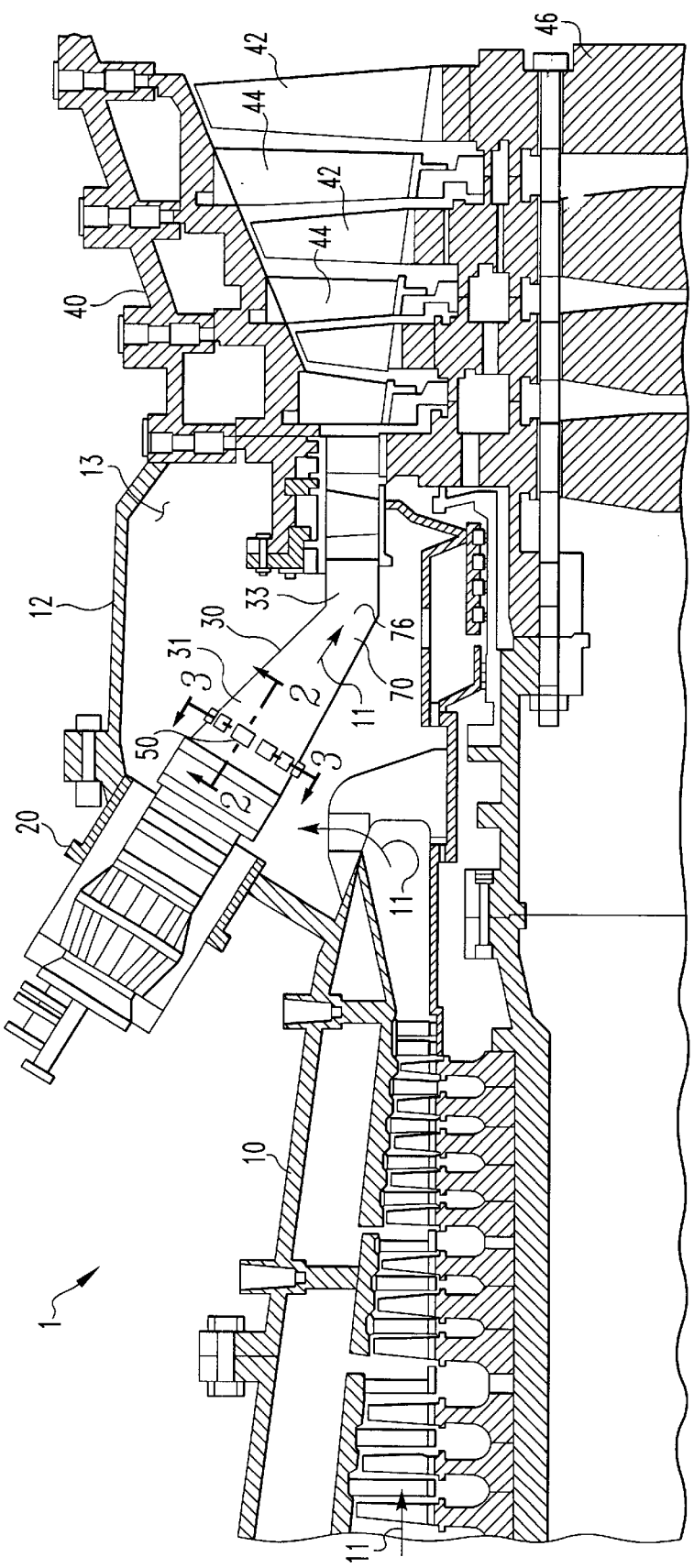
FIG. 1 is a schematic cross-sectional view of a combustion turbine power plant.

As shown in FIG. 1, a combustion turbine power plant 1 includes a compressor assembly 10, a combustor assembly 20, a transition section 30, and a turbine assembly 40. The compressor assembly 10, combustor assembly 20, transition section 30, and turbine assembly 40, define a flow path 11. The combustor assembly 20 may be a can-annular or annular combustor assembly.

As is well known in the prior art, the compressor assembly 10 includes a plurality of rotating blades and stationary vanes structured to compress a fluid. The combustor assembly 20 is disposed within a casing 12. The casing 12 defines a plenum 13. Compressed air from the compressor assembly 10 is delivered to the plenum 13. The combustor assembly 20 is coupled to a fuel source (not shown).

Within the primary combustor assembly 20, compressed air and fuel are mixed, ignited and consumed in a combustion zone, thereby creating a working gas. The working gas is delivered through flow path 11 to the transition section 30. Transition section 30 is also disposed within casing 12 in the plenum 13. The transition section 30 includes a housing 70 having an inner surface 74 (FIG. 3), which is adjacent to the working gas, and an outer surface 76 which is adjacent to the compressed air in plenum 13. The transition section 30 preferably has a portion with cylindrical cross section 31 and a portion with a rectangular cross section 33.

The flow path 11 extends through the transition section 30 into the turbine assembly 40. The turbine assembly 40 includes a plurality of rotating blades 42 and stationary vanes 44. As the working gas expands through the turbine assembly 40, the rotating blades 42, which are coupled to a shaft 46, formed by a plurality of rotors, rotate, thereby creating a mechanical force. The shaft 46 may be coupled to a generator which produces power.

In operation, the compressor assembly 10 inducts ambient air and compresses the air. The compressed air is channeled through the flow path 11 to the combustor assembly 20. Within the combustor assembly 20, the compressed air is combined with a fuel and ignited. The fuel air mixture is preferably a fuel lean mixture. When the fuel is consumed in the combustor assembly 20, a working gas is formed. The working gas travels through the flow path 11 to the transition section 30, within housing 70, and is then expanded through the turbine assembly 40.

Fluctuations in the rate of fuel consumption creates a standing acoustical pressure wave, e.g. a sound wave, which extends through the flow path 11 both upstream and downstream of the combustor assembly 20. When the combustion turbine power plant 1 is in a steady state of operation, the peaks of the acoustical pressure waves are relatively stationary. To dampen the damaging effects of the acoustical wave, it is desirable to locate a dampening resonator at the location of the peaks of the wave. Typically, the peak of the wave is located in the transition section 30. Preferably, at least one modular resonator 50 (described below) is disposed along the flow path 11 downstream of the combustion zone of combustor assembly 20.

Figure 2:
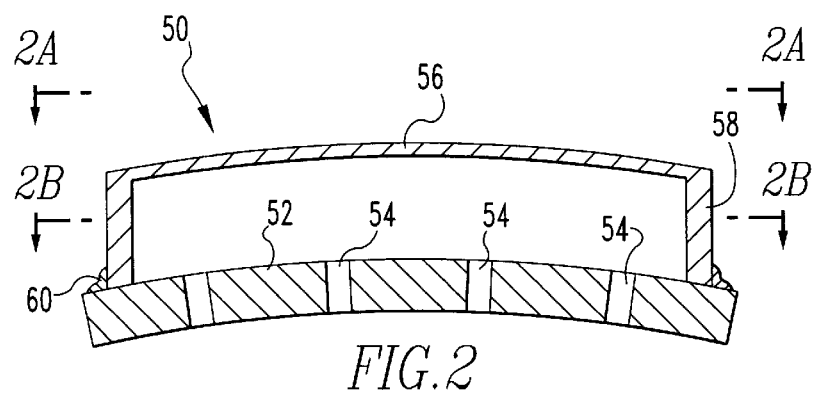
FIG. 2 is a cross-sectional view taken along line 2—2 of FIG. 1.

As shown in FIG. 2, a modular resonator 50 comprises a first member 52 having a plurality of openings 54 therethrough. The openings 54 are in fluid communication with the flow path 11. The first member 52 has a discrete size and shape which is, preferably, substantially less than the circumference of the transition section circular portion 31. When the first member 52 is integral to housing 70, the size of the first member 52 is limited to that portion of the housing 70 which is enclosed by second member 56 and/or sidewall 58 (described below). The modular resonator 50 further includes a second member 56 which is generally in a spaced relation from the first member 52 and which encloses a volume of gas between said first member 52 and said second member 56. The second member 56 may be of any shape, for example, but not limited to, a hemisphere or cylindrical. Preferably, however, the second member has a size generally equal to the size of the first member 52 and is held in a spaced relation by a sidewall 58. The sidewall 58 may be integral to second member 56 and extend from the peripheral edge of second member 56 in a generally perpendicular direction. When the first member 52 is integral to housing 70, the distal end of sidewall 58 is coupled to the housing outer surface 76. If first member 52 is not integral to housing 70, the distal end of sidewall 58 is coupled to the peripheral edge first member 52.

Figure 2A:
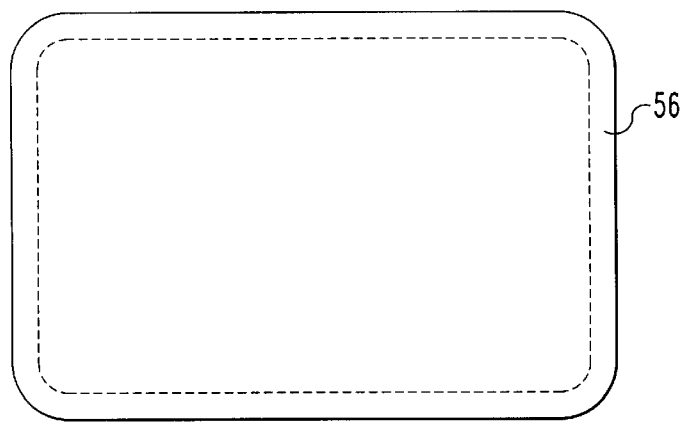
FIG. 2A is a top view as indicated by line A—A on FIG. 2.
Figure 2B:
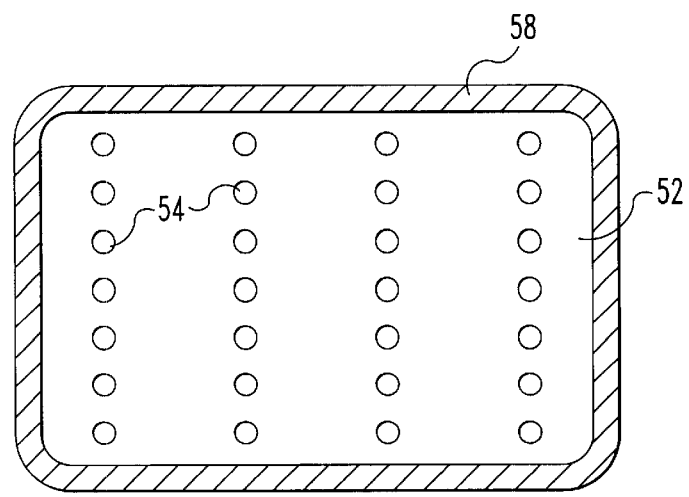
FIG. 2B is a cross-sectional view as indicated by line B—B on FIG. 2.

As shown in FIG. 2A, the second member 56 is preferably a solid member. As shown in FIG. 2B, the sidewall 58 preferably surrounds all openings 54 on the first member 52. As shown on FIG. 2, the sidewall 58 may be attached to the first member 52 by a weld 60. The holes 54 are preferably distributed in a uniform pattern on first member 52. The first member 52 and the second member 56 preferably have a rectangular shape having sides of about 2.0 inches (5.08 cm) and 3 inches (7.62 cm). Openings 54 are preferably circular openings having a diameter between about 0.060 inches (0.15 cm) and 0.120 inches (0.30 cm) and preferably about 0.090 inches (0.22 cm).

Figure 3:
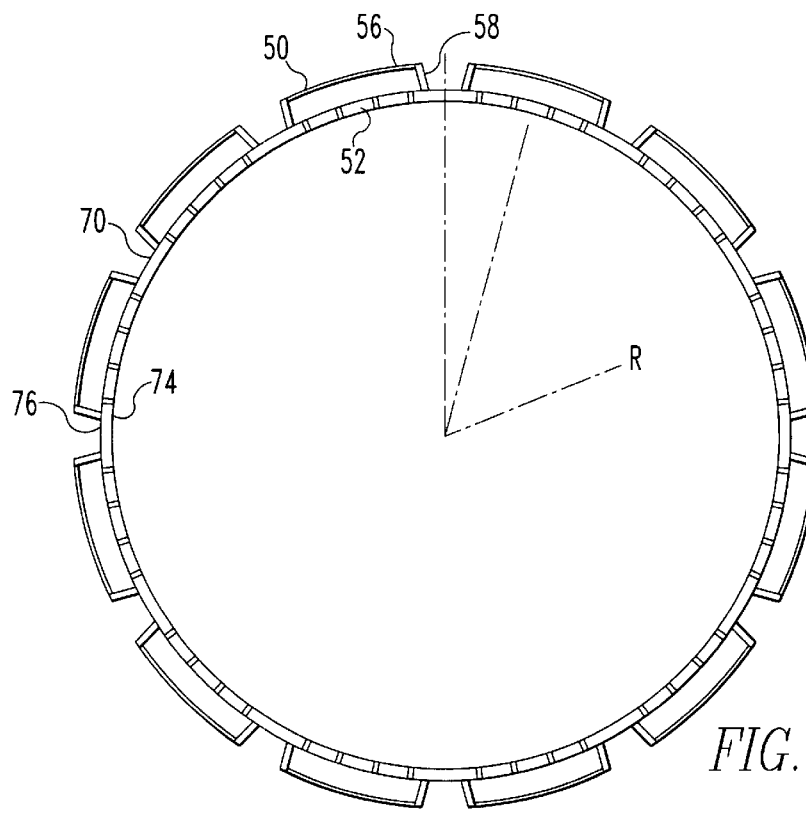
FIG. 3 is a cross-sectional taken along line 3—3 of FIG. 1.
Figure 4:
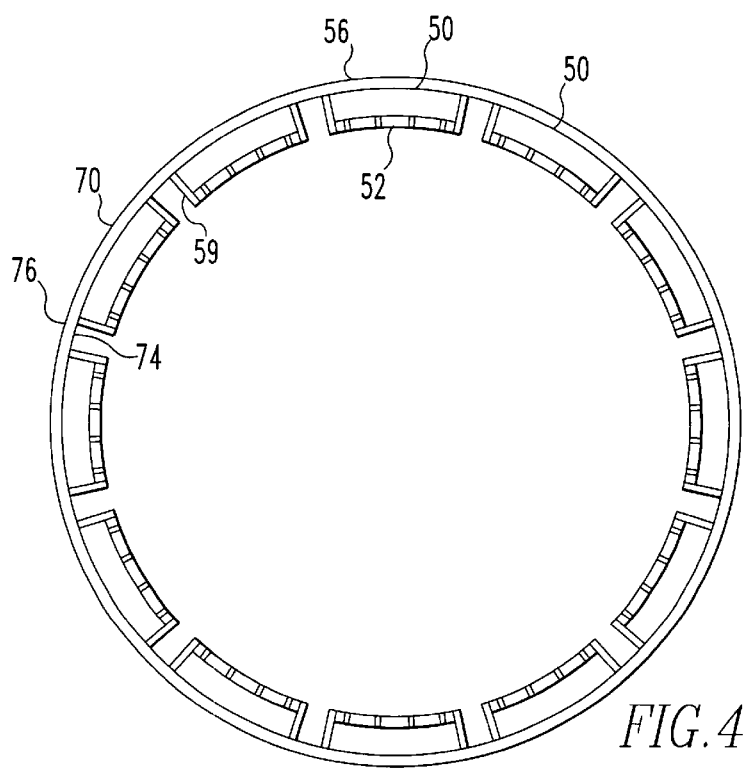
FIG. 4 is a alternate embodiment with the resonators inside the housing.

As shown in FIG. 3, a plurality of modular resonators 50 may be disposed on the housing outer surface 76. In this configuration, first member 52 is integral to housing 70 and sidewall 58 extends from housing outer surface 76. Alternatively, as shown on FIG. 4, a plurality of modular resonators 50 may be disposed on the housing inner surface 74. In this configuration, second member 58 is integral to housing 70 and sidewall 58 extends from housing inner surface 74. In the preferred embodiment, the modular resonator 50 is disposed between the housing 70 and casing 12 and the sidewall 58 is attached to the housing outer surface 76.

Figure 5A:
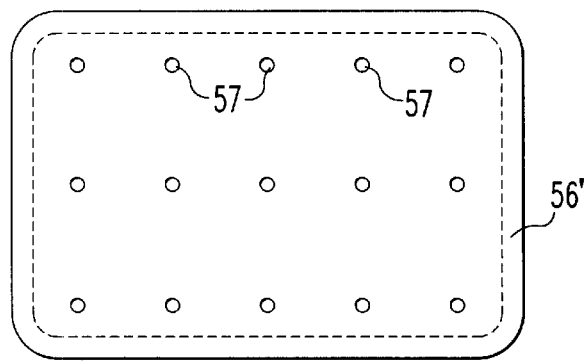
FIG. 5A is a top view as indicated by line A—A on FIG. 5.
Figure 5B:
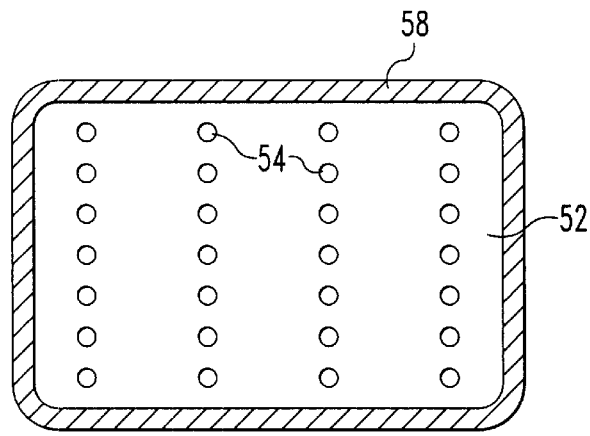
FIG. 5B is a cross-sectional view as indicated by line B—B on FIG. 5.
Figure 5C:
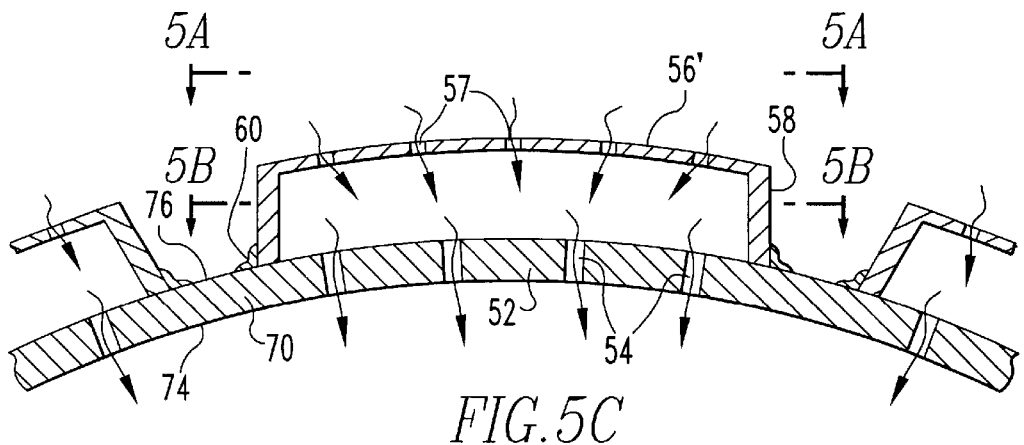
FIG. 5 is a cross-sectional of an alternate embodiment similar to the view in FIG. 2.

As shown in FIGS. 5, 5A and 5B, in an alternate embodiment, the second member 56' may include a plurality of openings 57. These openings are preferably evenly distributed on second member 56'. As before, sidewall 58 extends generally perpendicular from second member 56' and is attached by weld 60 to the first member 52. A purging flow of compressed air from plenum 13 flows through the second member openings 57, through the modular resonator 50, and into flow path 11 through first member openings 54. The compressed air in plenum 13 is at a greater pressure than the working gas downstream of the combustion zone. The second member openings 57 may be between about 0.040 inches (0.10 cm) and 0.080 inches (0.20 cm) in diameter and are preferably about 0.060 inches (0.15 cm) in diameter.

Another alternate configuration is shown in FIG. 6. The components of the modular resonator 50': first member 52', second member 56 and sidewall 58, may be formed integrally. In this configuration, each modular resonator 50 may be welded by attachment weld 62 to a attachment member 64 to form a portion of housing 70. Both the attachment member 64 and the first member 52' have a curvilinear surface which will result in a circular transition section 30 having an appropriate cross sectional area. While not shown on FIG. 6, the modular resonators 50 having openings 57 as shown in FIG. 5, may be incorporated into the integral modular resonators 50' shown in FIG. 6.

Figure 8:
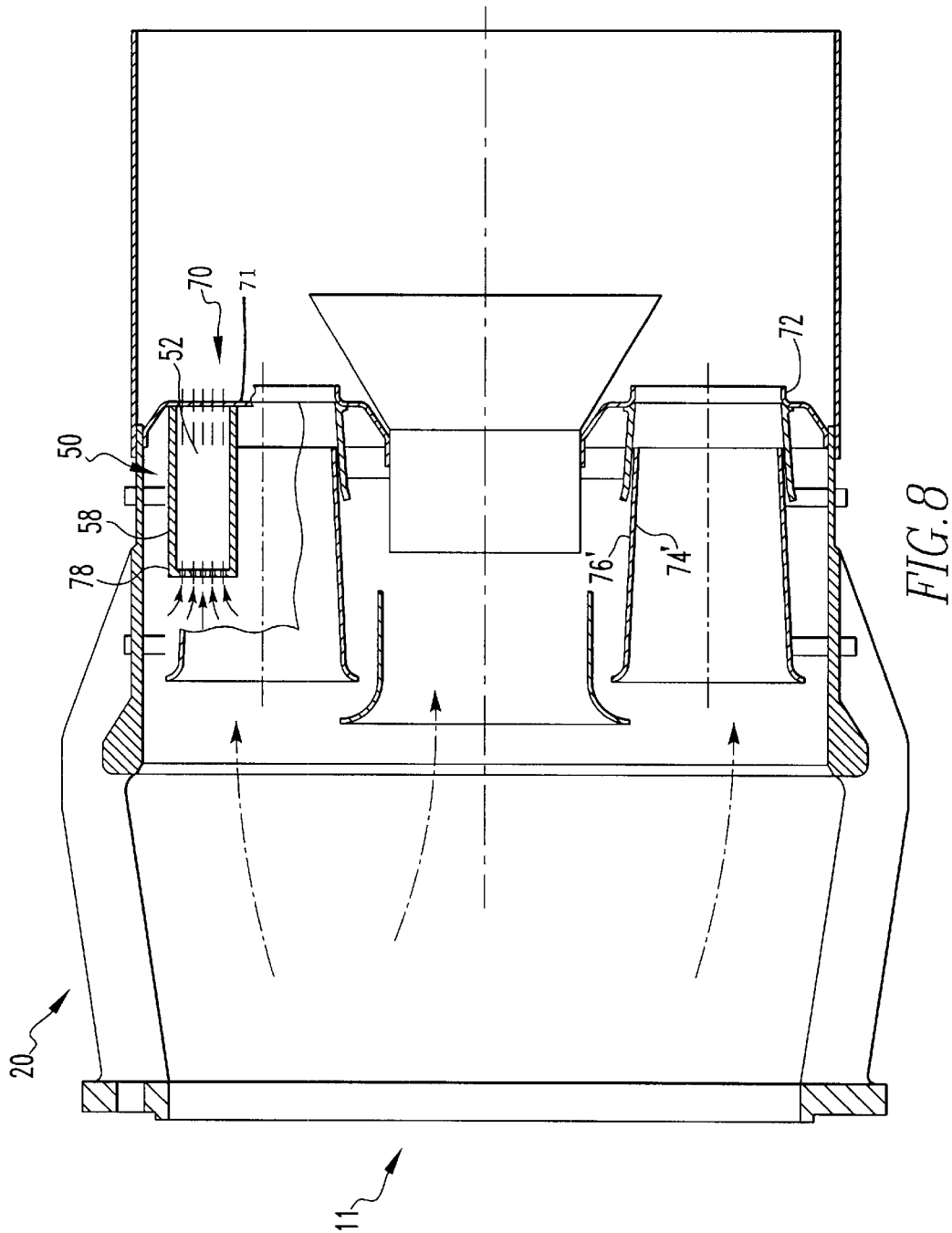
FIG. 8 is another alternate embodiment where the modular resonators are disposed on a support structure within the flow path and have a purging air flow.

A further alternate configuration, shown in FIG. 7, includes a modular resonator support structure within flow path 11. As shown, the support structure is located upstream of the combustor assembly 20. However, the location of the support structure 71 may be anywhere within the flow path 11, including, but not limited to the transition section 30. The modular resonator support structure 71 includes a plurality of tubular members 72 disposed axially within the flow path 11. The tubular members 72 have an inner surface 74' and an outer surface 76'. Modular resonators 50 may be disposed either on inner surface 74' or outer surface 76'. A portion of tubular member 72 becomes first member 52, having openings 54 therethrough. The modular resonator support structure 71 may support multiple tubular members 72. As shown in FIG. 8, the modular resonators 50 may include openings 78 on the upstream side of sidewall 58. Gas within the flow path 11 passes through the sidewall openings 78 thereby providing a purging airflow through the modular resonator 50.

The modular resonators 50 are most effective when disposed at the location within the flow path 11 having the greatest acoustical pressure amplitude and locations that are in fluid communication with the combustion zone. The location(s) having the greatest acoustical pressure amplitude are established using arrays of in-situ pressure fluctuation transducers. Alternatively, location(s) having the greatest acoustical pressure amplitude are established using finite-element or other acoustic prediction modeling methods. One such finite element modeling program is SYSNOISE distributed by LMS North America, 5455 Corporate Drive, Suite 303, Troy, Mich. 48098.

Figure 9:
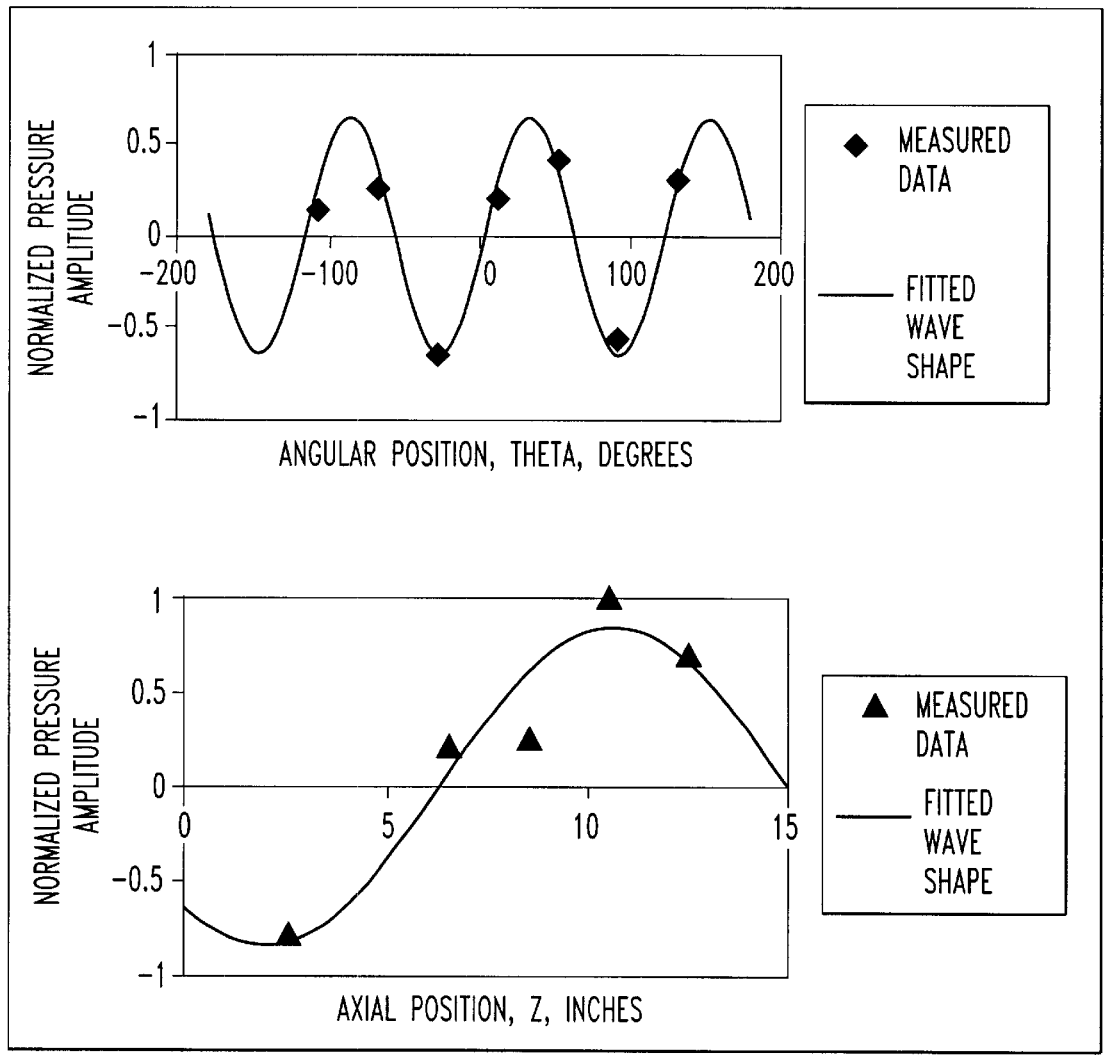
FIG. 9 is a graphical representation of the pressure wave amplitude within the transition section. The graphs represent the pressure wave amplitude compared to the angular position and the axial position.

As shown in FIG. 9, data, recorded from pressure fluctuation transducers, show that the greatest acoustical pressure amplitude occurs at about two inches and about eleven inches downstream of the leading edge of the transition section 30. This test was performed on a Siemens-Westinghouse W501F combustion turbine producing 184 MW of electrical power at a flow rate of 79,000 lb./hr. of natural gas fuel. The transition sections had a cross-sectional area of about 145 in.$^2$ The data generated by this experimental procedure data, as shown in FIG. 9, indicates the distribution the amplitude of acoustic pressure occurring at the inner surface 74 of the transition section 30 during a combustion instability. This data shows that the acoustical pressure reaches peak levels at certain angular positions around the transition section 30 circumference and at an axial positions of approximately two and eleven inches downstream from leading edge of the transition section 30. Having determined the location of the highest acoustical pressure amplitude, a plurality of modular resonators 50 may be attached to, or formed integrally with, transition section housing 70 at these locations. While individual resonators may be placed at only the angular location having the highest acoustic pressure, modular resonators 50 may also be spaced at intervals around the entire circumference of the housing 70 as shown in FIG. 3.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof

What is claimed is:

1. A resonator module in combination with a combustion turbine power plant, wherein said combustion turbine power plant has a compressor assembly, a combustor assembly, a turbine assembly, and a transition section between said combustor assembly and said turbine assembly which define a flow path, said resonator module comprising:

a first member having a size substantially smaller than the diameter of said flow path and a plurality of openings therethrough;

a second member maintained in a generally spaced relation to said first member and defining a volume of gas between said first member and said second member;

said first member having said openings in fluid communication with said flow path;

said transition section having a housing comprising said first member;

said housing having an inner surface and an outer surface, and being adjacent to and defining a portion of said flow path for said working gas;

said second member having attached a closed sidewall extending from the periphery of said second member generally perpendicular to said second member; and said sidewall being attached to the perimeter of said first member on said outer surface.

2. The resonator module of claim 1, wherein said sidewall is welded to said housing outer surface.

3. The resonator module of claim 2, wherein said first member is generally rectangular.

4. The resonator module of claim 3, wherein said first member has sides about 2.0 inches (5.08 cm) and 3.0 inches (7.62 cm).

5. The resonator module of claim 4, wherein said openings are circular and between about 0.060 inches (0.15 cm) and 0.12 inches (0.30 cm) in diameter.

6. The resonator module of claim 5, wherein said openings are about 0.090 inches (0.22 cm) in diameter.

7. The resonator module of claim 6, wherein:

said second member includes a plurality of openings; and said second member is structured to be coupled to a purging air supply which has a greater pressure that said working gas.

* * * * *